Patented Mar. 4, 1930

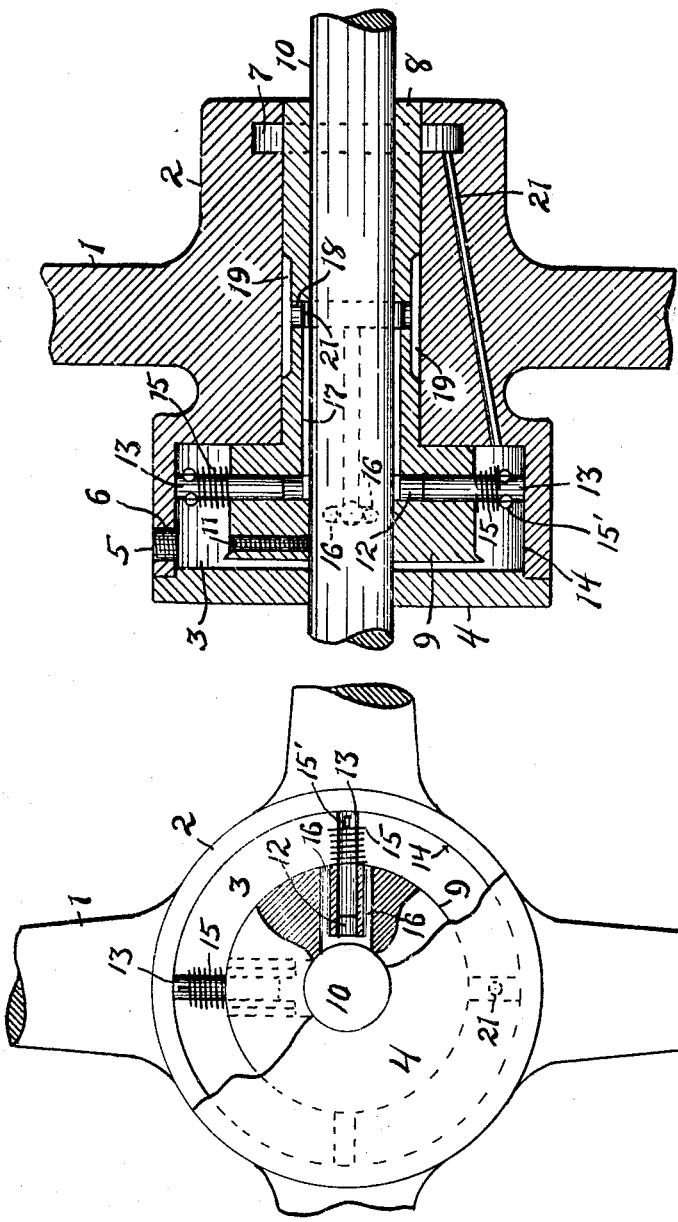

1,749,605

UNITED STATES PATENT OFFICE

RAY E. RIES AND FRED R. KOVERMAN, OF FORT WAYNE, INDIANA

LOOSE-PULLEY OILER

Application filed June 18, 1928. Serial No. 286,096.

This invention relates to improvements in loose pulley oilers, and the object thereof is to afford means in connection with a loose pulley and the shaft upon which it is mounted whereby a body of lubricating oil contained in the hub of the pulley will be caused to circulate and continuously flood the bearing upon which the pulley rotates when idling. Ordinarily, when a loose pulley is idling at high velocity, the lubricant tends to move away from the bearing because of centrifugal action, leaving the bearing without proper lubrication, and the present invention contemplates means to overcome such condition by causing the lubricant, after leaving the bearing, to be returned and thus maintain a film of lubricant upon the surface of the bearing.

These objects are accomplished by the construction illustrated in the accompanying drawings, in which:—

Fig. 1 is a fragmentary end elevation of a structure embodying the invention, portions being cut away; and Fig. 2 is a section of Fig. 1 in a plane at right angles thereto.

The characters appearing in the description refer to parts shown in the drawings and designated thereon by corresponding characters.

The invention consists of a pulley 1 having in one end of its hub 2 a chamber 3 that is closed at its outer end by a head 4, there being a removable plug 5 in the hub that closes a fill opening 6 therein. Adjacent the opposite end of the hub 2 of the pulley is made an annular recess 7.

The hub of the pulley has bearing upon a bushing 8 that extends loosely through the bore of the hub, and said bushing has a cylindrical head 9 at one end thereof that is disposed within the chamber 3, said bushing and its head 9 being concentric with the axis of the pulley.

A shaft 10 extends into the bore of the bushing upon which shaft the bushing is fixed by means of a set-screw 11 so that said bushing is held stationary with respect to the shaft.

In the head 9 of the bushing are made radially disposed guide openings 12, disposed in opposite pairs, in each of which openings is movably positioned a rake 13 consisting of a stud that extends into the corresponding opening, the outer end of which stud bears against the inner periphery 14 of the hub, there being a compression spring 15 disposed on each rake between projections 15' thereon and the head 9 of the bushing whereby contact between the rakes and the inner perimeter of the hub is constantly maintained.

The head 9 of the bushing has also made therein adjacent each side of each guide-way 12 an oil receiving opening 16 that extends into an oil duct 17 made in the bore of the bushing, there being a corresponding port 18 in said bushing that affords communication between the duct and oil grooves 19 in the exterior face of the bushing. In this manner is formed a passageway for oil from the chamber 3 to pass into the oil grooves 19 and lubricate the hub or bearing surface of the pulley. An annular recess 21 made in the bore of the bushing connects the ports 18 and admits of free distribution of oil to the oil grooves 19.

The pulley has also made in its hub a return duct 21 that connects the annular recess 7 and the chamber 3, so that surplus oil from the oil grooves, after passing into the recess 7 is directed back into the chamber 3.

In the operation of the invention, the chamber is filled with lubricating oil through its fill opening 6 and is sealed therein by the plug 5, and as the pulley is rotated idly upon the bushing, the lubricant, owing to centrifugal action tends to form a layer upon the inner perimeter of the hub. The outer ends of the rakes become immersed in the layer of oil, which causes the oil to become diverted into the oil inlet openings 16. The diverted oil that passes into said openings flows through the ducts 17 and ports 18 into the oil grooves 19 and bathes the bearing surfaces of the hub and bushing. Any surplus oil that enters the recess 7 passes through the return duct 21 back into the chamber 3 from which it is redistributed as in the first instance. In this manner a continuous circulation of the lubricant is maintained about the bearing.

What we claim is:—

1. An appliance of the class described, consisting of a pulley having in one end of its hub a closed chamber, and at a point spaced from its opposite end an internal annular recess, there being also a return duct connecting said recess and chamber; a shaft; a bushing fixedly mounted on said shaft and upon which bushing said pulley is loosely mounted, said bushing having a head disposed within said chamber, there being a series of radially disposed guide openings in said head, and also adjacent each guide opening an oil inlet opening, said bushing having also oil grooves exposed to the bearing surface of said hub, and ducts and corresponding ports connecting said oil inlet openings and said oil grooves; and a spring pressed rake member positioned in each guide opening, which rake bears outwardly against the wall of said chamber.

2. An appliance of the class described, consisting of a pulley having in one end of its hub a closed chamber, and also a return duct having communication with the bore of said hub and said chamber; a bushing positioned loosely in the bore of said hub, provided with oil grooves exposed thereto, and having passageways communicating with said oil grooves and the interior of said chamber; a shaft extending into said bushing and being fixed therein against relative rotation; and a series of rake members disposed within the chamber in supported relation with said bushing, and having sliding contact with the inner perimeter of said hub.

3. In an appliance of the class described, a pulley having a closed chamber in one end of its hub; a bushing extending into the bore of said hub and forming a bearing therefor, said bushing having oil grooves exposed to said bore, and passageways affording communication between said oil grooves and said chamber; and a series of spring pressed rake members supported by the bushing and having sliding contact with the inner perimeter of said hub.

In testimony whereof we affix our signatures.

RAY E. RIES.
FRED R. KOVERMAN.